United States Patent
Sinha et al.

(10) Patent No.: US 11,232,483 B2
(45) Date of Patent: Jan. 25, 2022

(54) MARKETING ATTRIBUTION CAPTURING SYNERGISTIC EFFECTS BETWEEN CHANNELS

(71) Applicant: ADOBE INC., San Jose, CA (US)

(72) Inventors: Ritwik Sinha, Cupertino, CA (US); David Arbour, San Jose, CA (US); Aahlad Manas Puli, Brooklyn, NY (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/682,089

(22) Filed: Nov. 13, 2019

(65) Prior Publication Data

US 2021/0142360 A1 May 13, 2021

(51) Int. Cl.
*G06Q 30/00* (2012.01)
*G06Q 30/02* (2012.01)

(52) U.S. Cl.
CPC .............. *G06Q 30/0254* (2013.01)

(58) Field of Classification Search
None
See application file for complete search history.

(56) References Cited

U.S. PATENT DOCUMENTS

| 9,697,534 | B2* | 7/2017 | Schnabl | G06Q 30/0244 |
| 9,947,024 | B1* | 4/2018 | Shariff | G06Q 30/0256 |
| 2011/0035275 | A1* | 2/2011 | Frankel | G06F 3/0481 |
| | | | | 705/14.45 |
| 2016/0098735 | A1* | 4/2016 | Sinha | G06Q 30/0202 |
| | | | | 705/7.31 |
| 2020/0126126 | A1* | 4/2020 | Briancon | G06K 9/6259 |

OTHER PUBLICATIONS

Lee et al. published article "Estimating Conversion Rate in Display Advertising from Past Performance Data", 2012, ACM (Year: 2012).*

Chen et al. published article "Factor Modeling for Advertisement Targeting", Aug. 9, 2017, people.eecs.berkeley.edu (Year: 2017 ).*

Scott Rheinlander published article "Everything you wanted to know about marketing attribution models (but were afraid to ask)", Apr. 19, 2019, www.SalesForce.com (Year: 2019).*

(Continued)

*Primary Examiner* — Naresh Vig

(74) *Attorney, Agent, or Firm* — F. Chau & Associates, LLC

(57) ABSTRACT

Systems and methods are described for a causal marketing attribution process that includes the receiving of a plurality of marketing events associated with a customer and computing a sum of a plurality of channel-specific terms corresponding to the plurality of marketing events, wherein each of the plurality of channel-specific terms comprises a channel-specific base parameter and a channel-specific decay parameter. Additionally, the causal marketing attribution process computes a sum of a plurality of interaction terms, wherein each interaction term comprises a product of a pair of channel-specific terms, and determines a probability of a target outcome for the customer based on the sum of the plurality of channel-specific terms and the sum of the plurality of interaction terms.

20 Claims, 10 Drawing Sheets

(56) References Cited

OTHER PUBLICATIONS

Wikipedia published article "Attribution (Marketing)", Dec. 13, 2018, Wikipedia, printed through www.archive.org (date is in the URL in YYYYMMDD format) (Year: 2018).*

Kitts et al. published article "Attribution of conversion events to multi-channel media", 2010, IEEE, 2010 IEEE International Conference on Data Mining, pp. 881-886 (Year: 2010).*

Anderl, et al., "Mapping the Customer Journey: A Graph-Based Framework for Online Attribution Modeling", Oct. 18, 2014, Available at SSRN 2343077, 2014, 36 pages.

Carpenter, et al., "STAN: A Probabilistic Programming Language", Journal of Statistical Software, Jan. 2017, vol. 76, Issue 1, 32 pages.

Jin, et al., "Bayesian Methods for Media Mix Modeling With Carryover and Shape Effects", Apr. 14, 2017, 34 pages.

Kakalejcik, et al., Multichannel Marketing Attribution Using Markov Chains, Journal of Applied Management and Investments, vol. 7, No. 1, pp. 49-60.

Sinha, et al., "Estimating the Incremental Effects of Interactions for Marketing Attribution", 2014 International Conference on Behavioral, Economic, and Socio-Cultural Computing (BESC2014), IEEE, 2014, 6 pages.

Yadagiri, et al., "A Non-Parametric Approach to the Multi-Channel Attribution Problem", WISE, 2015, 15 pages.

* cited by examiner

MARKETING ATTRIBUTION CAPTURING SYNERGISTIC EFFECTS BETWEEN CHANNELS

BACKGROUND

The following relates generally to data analytics and more specifically to causal marketing attribution.

Marketing refers to activities taken by companies and individuals to encourage potential customers to purchase products or services. Marketing may take a variety of different forms, which may be referred to as marketing channels. A person or company may employ a variety of different marketing channels such as email, television, display, and social media to encourage sales.

In many cases, the influence of each channel is difficult to detect. Thus, marketing efforts may be misdirected to channels that are inefficient or that have little impact on potential purchasers. Inefficient matching between products and customers may result in losses of time and sales. Thus, there is a need for improved systems and methods to determine and interpret the influence of various marketing channels on customers' purchase decisions.

SUMMARY

A method, apparatus, and non-transitory computer readable medium for causal marketing attribution are described. Embodiments of the method, apparatus, and non-transitory computer readable medium may identify a plurality of marketing events associated with a customer, compute a sum of a plurality of channel-specific terms corresponding to the plurality of marketing events, wherein each of the plurality of channel-specific terms comprises a channel-specific base parameter and a channel-specific decay parameter, compute a sum of a plurality of interaction terms, wherein each interaction term comprises a product of a pair of channel-specific terms, determine a probability of a target outcome for the customer based on the sum of the plurality of channel-specific terms and the sum of the plurality of interaction terms, and presenting a marketing event to the customer based at least in part on the probability of the target outcome.

A method, apparatus, and non-transitory computer readable medium for causal marketing attribution are described. Embodiments of the method, apparatus, and non-transitory computer readable medium may receive a plurality of marketing events and corresponding outcomes associated with a plurality of customers, identify a marketing attribution model comprising a customer-independent baseline parameter, a plurality of customer-heterogeneity parameters, a sum of a plurality of channel-specific terms, and a sum of a plurality of interaction terms, wherein each of the channel-specific terms is based on a channel-specific base parameter and a channel-specific decay parameter, and each of the interaction terms is based on an interaction strength parameter, and a channel-specific base parameter and a channel-specific decay parameter for pair of marketing events, identify a prior distribution for the customer-independent baseline parameter, the interaction strength parameter, and the channel-specific base parameter and the channel-specific decay parameter, and apply a Bayesian statistical model to compute updated distributions for the customer-independent baseline parameter, the interaction strength parameter, and the channel-specific base parameter and the channel-specific decay parameter for each of the corresponding marketing events based on the plurality of marketing events and the corresponding outcomes.

A method, apparatus, and non-transitory computer readable medium for causal marketing attribution are described. Embodiments of the method, apparatus, and non-transitory computer readable medium may receive a plurality of marketing events and corresponding outcomes associated with a plurality of customers, determine a marketing attribution model comprising a sum of a plurality channel-specific terms and a sum of a plurality of interaction terms by applying a Bayesian statistical model using the plurality of marketing events and the corresponding outcomes, identify a plurality of candidate marketing strategies, and select one of the plurality of candidate marketing strategies using the marketing attribution model.

DETAILED DESCRIPTION

Figure 1:
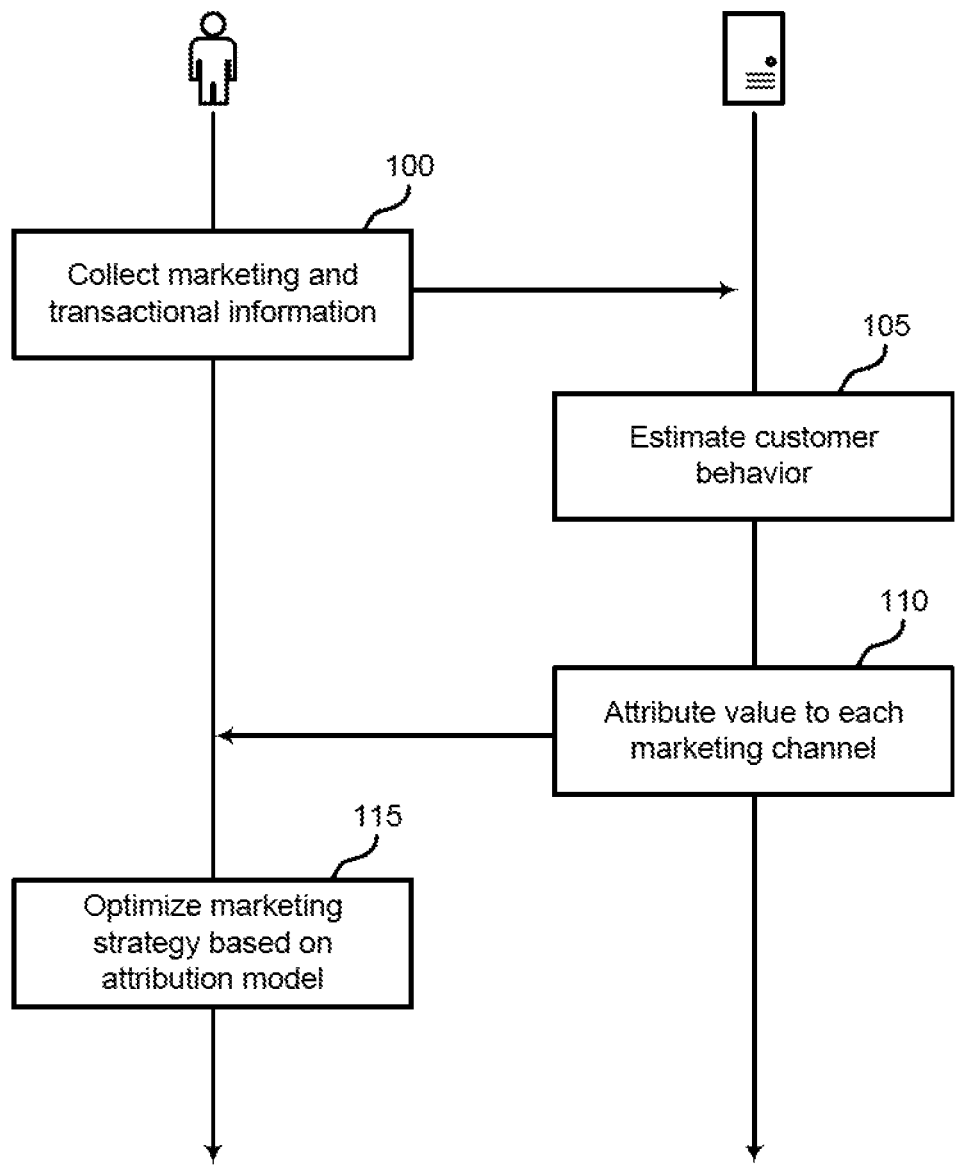
FIG. 1 shows an example of a process to optimize a marketing strategy based on an attribution model according to aspects of the present disclosure.

The present disclosure describes systems and methods for causal marketing attribution that captures the synergistic effects between different marketing channels. In a multi-channel marketing environment, a purchase decision is often based on a series of interactions such as e-mail, mobile, display advertising, and social media. These interactions have both direct, and indirect, influence on the final decisions of the customer. A marketer is responsible for understanding how the various marketing efforts affect a customer's final purchasing decision to maximize sales. For example, a marketer can optimize an advertising budget by using a combination of interacting marketing channels.

In many cases, the influence of each channel may be difficult to detect. For example, it may be difficult to distinguish between the effects of a television ad, a marketing email, and an online ad if a customer has been exposed to all of these marketing channels at different times. If purchase decisions are attributed to the wrong marketing channels, marketing efforts may be directed to channels that are inefficient. This may result in a loss of time and money.

A variety of methods may be used to attribute influence to different marketing channels. For example, in First Touch Attribution, the entire credit for a desired result (i.e., a sale) may be attributed to the first marketing event a customer is exposed to. In Last Touch Attribution, the entire credit is applied to the last event. In Equal Touch Attribution, equal credit may be applied to all marketing events. However, none of these approaches account for the timing of the events in relation to the sale (or other target outcome) or for interaction effects between events.

Therefore, marketers may utilize more sophisticated marketing attribution models. For example, in some cases model parameters may be exponential in the number of touches and number of events per customer (i.e., to represent diminishing returns for multiple touches). In some cases, the average of the lost value of not using a particular ad channel is calculated over multiple possible sets of ads. In other cases, models assign transition probabilities between touches and sales. This allows for an attribution to be computed as the ratio of conditional probabilities of a sale with and without an ad, respectively.

These more sophisticated methods may target carry-over and shape effects, and may focus on time-series modeling of the delayed customer response for each separate ad channel, using a non-parametric functions. However, in some cases even these models fail to capture the specific mechanisms by which a customer arrives at a purchase decision. For example, in some models the interactions between two ad channels may not be considered. Furthermore, due to the lack of intuition of traditional market attribution models, determining the influence of each channel may be difficult.

Therefore, embodiments of the present disclosure enable causal marketing attribution that takes into account the interaction among different marketing channels, as well as the decay of marketing influence over time. Marketing influence is attributed to different marketing channels using a model that takes into account the timing and interaction of different marketing events. First, an estimate of the behavior of a customer when exposed to a variety of marketing channels is determined. Second, using probabilistic models of customer behavior, the behavioral estimates from the first stage influence each channel of the output estimated attributions on the various marketing channels.

Embodiments of the present disclosure may be used in a marketing pipeline (e.g., between the data-collection and ad-assignment optimization stage). This allows the marketer to better calibrate ad campaigns.

For example, at least one embodiment of the present disclosure includes systems and methods for attributing marketing influence to different marketing channels using a model that takes into account the timing and interaction of different marketing events. The described systems and methods are based at least in part on a probabilistic model for predicting the likelihood of a target outcome based on a time series of marketing events. A causal attribution system may identify a plurality of marketing events associated with a customer, compute the sum of a plurality of channel-specific terms corresponding to the plurality of marketing events, compute the sum of a plurality of interaction terms, and determine the probability of a target outcome for the customer based on the computed sums. Each of the channel-specific terms and the interaction terms also includes a decay parameter. The model may also include a customer-independent baseline parameter and a customer-heterogeneity parameter.

Furthermore, the model provides parameters that have a natural interpretation, making it easier for marketers to utilize the parameters of the model in a way that helps optimize a marketing campaign. Additionally, the model may provide distributions over marketing attributions reflect uncertainty inherent in the data given data from the recent marketing history of a product.

Embodiments of the present disclosure model the synergistic effects between marketing channels in a manner such that counterfactual questions can be answered assuming flexible, probabilistic customer behavior with model marketing characteristics. The model marketing characteristics may include the direct effect of a marketing channel interaction and the decay of the direct effect of a marketing channel interaction, which informs of the half-life of an ad. Additionally, other model marketing characteristics may include the interaction or synergistic effects between ads, modeling customer heterogeneity (impulsive vs. careful buyers), control observed features of a customer, and generate variance (or error) estimates for all estimated parameters.

The following terms are used throughout the present disclosure:

A "marketing event" refers to the exposure of a customer to an event in one or more marketing channels, such as when a customer views an online ad, reads an advertising email, or sees a product placement in a video.

The term "marketing attribution" refers to the process of identifying the influence of different marketing events (e.g., an email advertisement or a video advertisement) in a multi-channel marketing environment.

A "marketing attribution model" refers to an equation, algorithm, or system that captures and implements marketing attribution information. For example, a marketing attribution model may be an equation whose parameters represent the influence of different marketing channels, and which enables predictions to be made regarding the influence of a series of marketing events on a customer's purchase decision.

A "channel-specific term" is a term in a marketing attribution model that includes a "channel-specific base parameter" representing the underlying influence of a marketing channel and a "decay parameter" representing how quickly the influence of a marketing event decays over time. For example, a particular channel-specific term may represent how much more likely a customer is to buy a product if they read an advertising email two days past.

An "interaction term" is a term in a marketing attribution model that includes an "interaction strength parameter" representing how the existence of multiple marketing events impacts each other as well as the channel-specific base parameters and decay parameters for a pair of events. For example, particular interaction terms might represent the difference between the impact of both reading an email and viewing an online ad as compared to the sum of the influence of those events taken separately. In many cases, the interaction strength parameter is negative, meaning that exposure to multiple marketing channels has diminishing returns.

A "customer-independent baseline parameter" is a term in a marketing attribution model that may represent the baseline probability that a customer will make a purchase (or some other target outcome) without exposure to any marketing.

A "customer-heterogeneity parameter" is a term in a marketing attribution model that may represent the difference between different customers with regard to the likelihood that they will purchase a product or service.

A "Bayesian statistical model" is a model where probability expresses a degree of belief in an event. Bayesian statistics are largely based on the following result in conditional probability:

$$P(A|B)=P(B|A)P(A)/P(B) \quad (1)$$

That is, the probability of a first event given a second event is equal to the probability of the second event given the first, multiplied by the probability of the first event divided by the probability of the second event.

A Markov Chain Monte Carlo (MCMC) is a statistical method comprising a class of algorithms used for sampling from a probability distribution.

Figure 9:
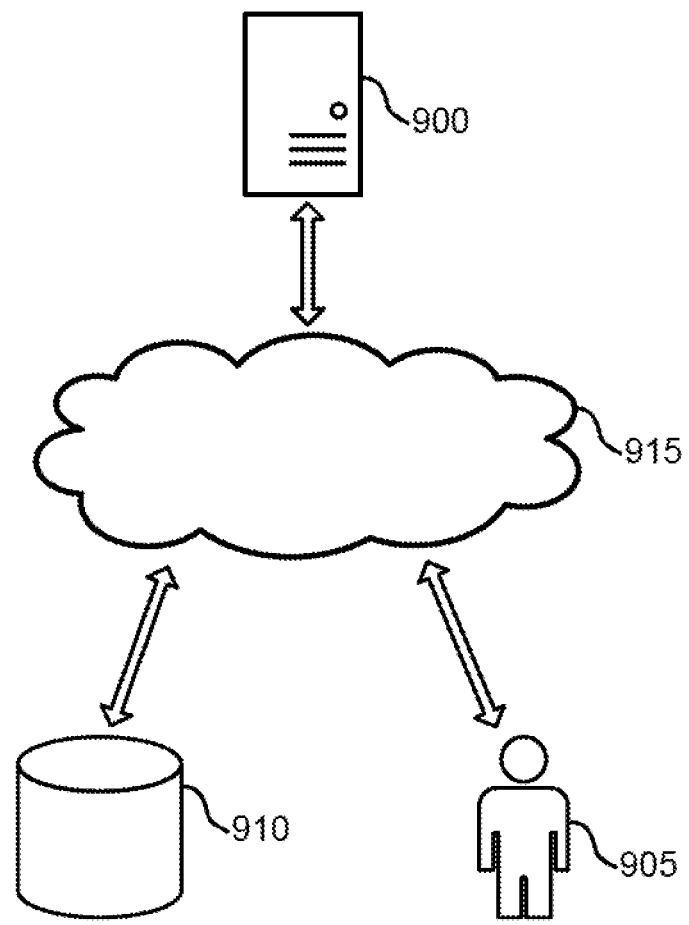
FIG. 9 shows an example of a marketing attribution system according to aspects of the present disclosure.
Figure 10:
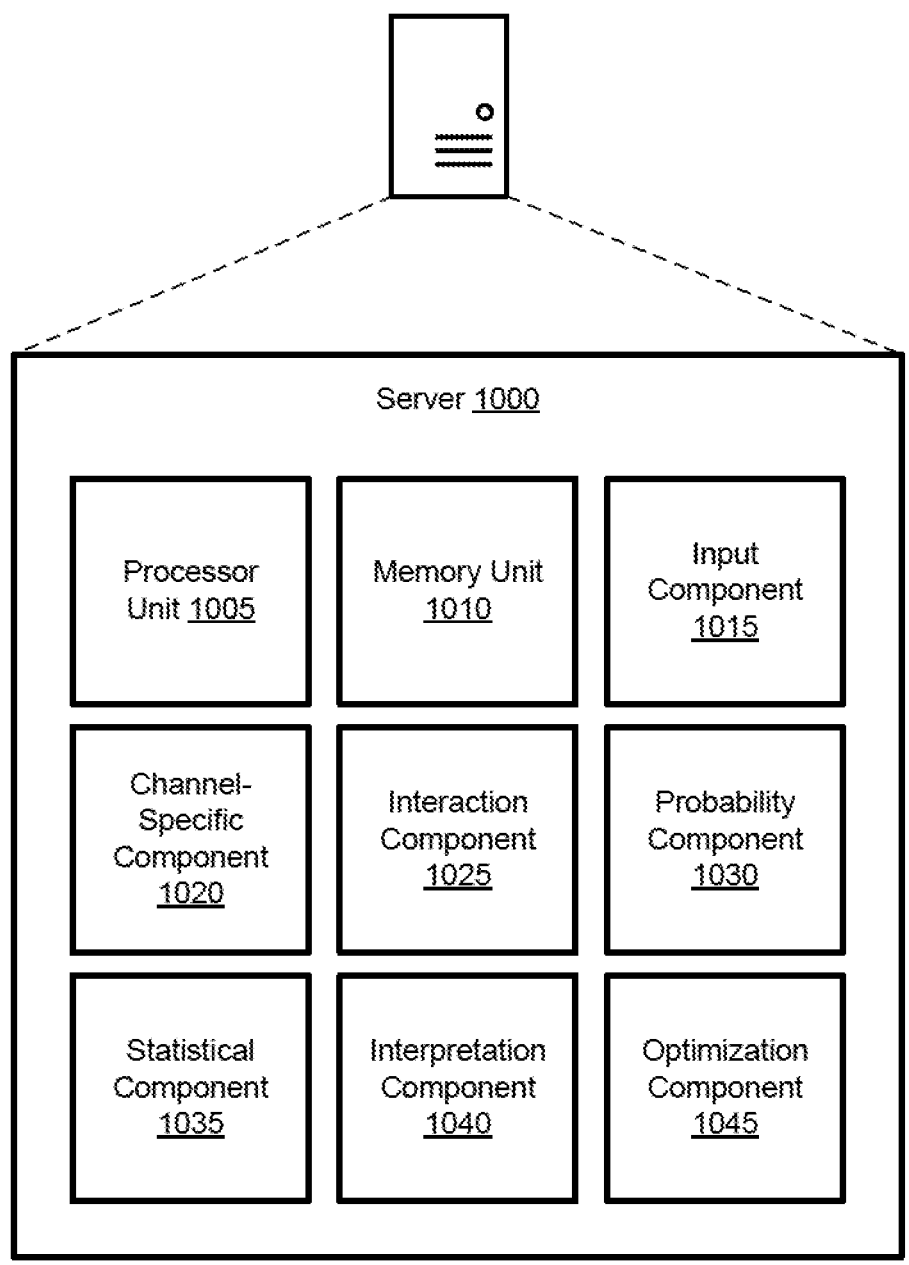
FIG. 10 shows an example of a marketing attribution apparatus according to aspects of the present disclosure.

FIG. 1 shows an example of a process to optimize a marketing strategy based on an attribution model according to aspects of the present disclosure. The process depicted in FIG. 1 includes operations performed by a user (i.e., a marketing decision maker) and a marketing attribution server as described in FIGS. 9 and 10.

Marketing attribution enables the interpretation of the influence of the various marketing channels on the customer's decision process. Marketing attribution can utilize traditional market attribution models that assign influence to each marketing channel in an overly simplistic, rule-based manner as described above (i.e., First Touch Attribution, Last Touch Attribution, or Equal Touch Attribution). However, none of these approaches account for the timing of the events in relation to the sale (or other target outcome) or for interaction effects between events. Thus, FIG. 1 provides a marketing attribution process that takes into account time decay and interactions among marketing channels.

At operation 100 the marketing attribution system collects marketing and transactional information. In some cases, this operation may refer to, or be performed by, a user as described with reference to FIG. 9.

At operation 105, the marketing attribution system estimates customer behavior. At operation 110, the marketing attribution system attributes value to each marketing channel. In some cases, the operations of blocks 105 and 110 may refer to, or be performed by, a server as described with reference to FIGS. 9 and 10.

At operation 115, the marketing attribution system optimizes marketing strategy based on an attribution model. In some cases, this operation may refer to, or be performed by, a user as described with reference to FIG. 9.

The process described in FIG. 1 provides generalized framework for considering attribution techniques with a likelihood-based model. In some cases, position-based methods are used that take into account the relative positions of different marketing events. Moreover, simple design choices allow for the incorporation of time-dependence and interaction between the models. Furthermore, the marketing attribution model uses parameters that correspond to many real-world attributions of the marketing process. For example, a Bayesian formulation provides a model validation measure of the likelihood score. Metrics such as customer fatigue and heterogeneity, ad touch decay with respect to time, and interactive effects of multiple channels are provided in the calculation.

Figure 2:
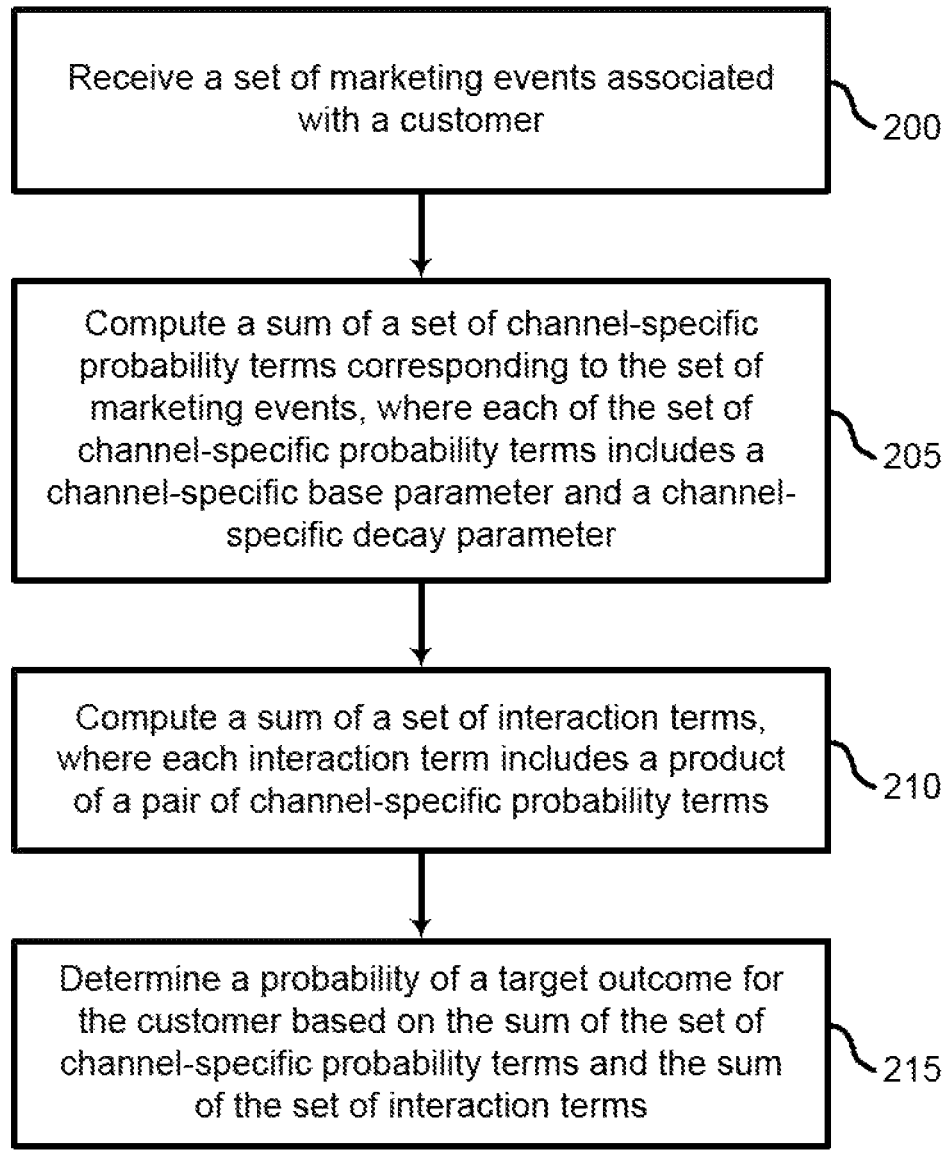
FIG. 2 shows an example of a process for determining a probability of a target outcome for the customer according to aspects of the present disclosure.

FIG. 2 shows an example of a process for determining a probability of a target outcome for the customer according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 200, the marketing attribution system receives a set of marketing events associated with one or more customers. For example, the marketing events may be gathered using a marketing analytics platform such as Adobe Experience Cloud©. In some cases, this operation may refer to, or be performed by, an input component as described with reference to FIG. 10.

At operation 205, the marketing attribution system computes a sum of a set of channel-specific terms corresponding to the set of marketing events, where each of the set of channel-specific terms includes a channel-specific base parameter and a channel-specific decay parameter. In some cases, this operation may refer to, or be performed by, a channel-specific component as described with reference to FIG. 10. An example of a process to compute the sum of the channel-specific terms is described in more detail in FIG. 3.

At operation 210, the marketing attribution system computes a sum of a set of interaction terms, where each interaction term includes a product of a pair of channel-specific terms. In some cases, this operation may refer to, or be performed by, an interaction component as described with reference to FIG. 10. An example of a process to compute the sum of the interaction terms is described in more detail in FIG. 4.

At operation 215, the marketing attribution system determines a probability of a target outcome for the customer based on the sum of the set of channel-specific terms and the sum of the set of interaction terms. In some cases, this operation may refer to, or be performed by, a probability component as described with reference to FIG. 10. An example of a process to determine a probability of a target outcome for the customer described in more detail in FIG. 5.

As an example, the following marketing attribution model may be used:

$$P(r=1|a_1,t_1,\ldots,a_k,t_k)=g(\mu+b_i+\Sigma_i\beta_{a_i}\lambda_{a_i}^{t_i}+\Sigma_{i\neq j}\gamma\beta_{a_i}\beta_{a_j}\lambda_{a_i}^{t_i}\lambda_{a_j}^{t_j}) \quad (2)$$

The parameters may correspond to distinct real-world values. The parameter $\mu$ captures the customer-independent baseline chance of purchase. $b_i$ reflects customer-heterogeneity of the ith customer, which is forced to be 0-mean. $\beta_a,\lambda_a$ are the channel-specific base magnitude and decay parameters, respectively. $\gamma$ controls the magnitude and direction of interactive effects. g is a link function that specifies the class of predictions; e.g. either continuous, binary, or otherwise. In some cases, the marketing attribution model can further incorporate elements such as conditioning on previous sales and other observed characteristics of a customer.

According to at least one embodiment, the parameters of the model may be computed using a Bayesian statistical model. In other embodiments, the parameters may be computed using a gradient descent algorithm. Further detail regarding computing the parameters is described below with reference to FIGS. 6 and 7.

Assigning counterfactual meaning to the present disclosure's predictions may be accomplished using additional modifications and assumptions. An additional term $\Sigma_{k=1}^{K-1}\theta_k y_{k,i}$ may be used for the prediction of the outcome $y_k$. This incorporates a linear combination of the previous sales into the model. The correct specification of the present disclosure is assumed. The assignment of touches at any time step and the time-differences between touches are independent of the future sales given the past sales, and ad touch history is assumed. Under these assumptions, the attributions become counterfactual in nature.

In some cases, a marketing event may be presented to a customer based on the probability of the target outcome. For example, one or more advertisements in different advertising channels may be presented to the customer.

Figure 3:
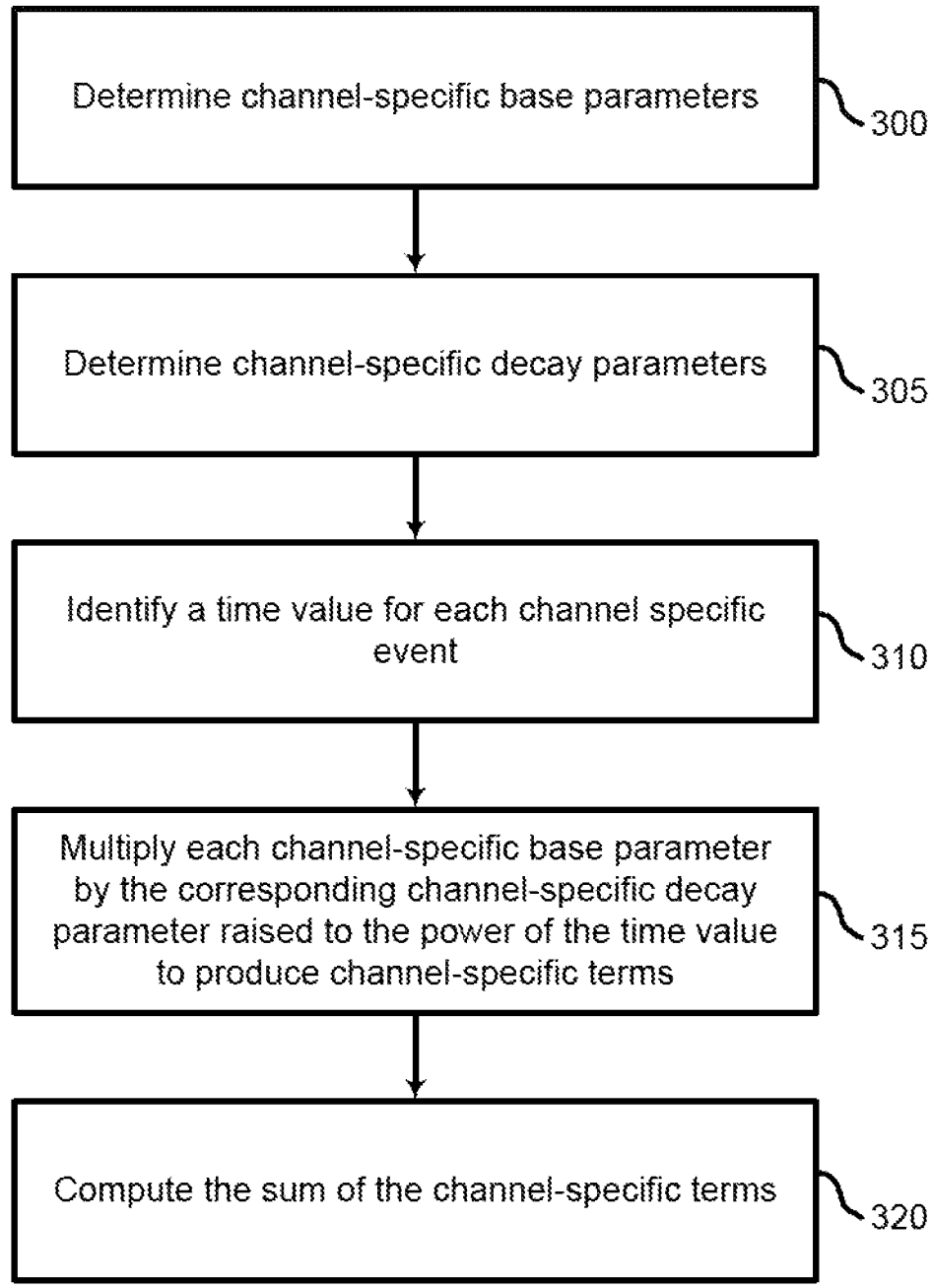
FIG. 3 shows an example of a process to compute the sum of the channel-specific terms according to aspects of the present disclosure.

FIG. 3 shows an example of a process to compute the sum of the channel-specific terms according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 300, the marketing attribution system determines channel-specific base parameters (e.g., $\beta_a$). The channel-specific base parameters may intuitively correspond to the initial influence of a particular marketing channel on a purchase decision. In some cases, this operation may refer to, or be performed by, a channel-specific component as described with reference to FIG. 10.

At operation 305, the marketing attribution system determines channel-specific decay parameters (e.g., $\lambda_a$). The channel-specific decay parameters may intuitively represent the rate at which the influence of a channel decays over time. In some cases, this operation may refer to, or be performed by, a channel-specific component as described with reference to FIG. 10.

At operation 310, the marketing attribution system identifies a time value for each channel specific event (i.e., $t_i$). The time value may represent the time at which a marketing event occurred. In some cases, the time is expressed in terms of how far in time the marketing event is from a purchase decision. In some cases, this operation may refer to, or be performed by, a channel-specific component as described with reference to FIG. 10.

At operation 315, the marketing attribution system multiplies each channel-specific base parameter by the corresponding channel-specific decay parameter raised to the power of the time value to produce channel-specific terms (e.g., $\beta_{a_i}\lambda_{a_i}^{t_i}$). Thus, the channel-specific terms may intuitively represent the actual influence of a marketing event at the time of a purchase decision. In some cases, this operation may refer to, or be performed by, a channel-specific component as described with reference to FIG. 10.

At operation 320, the marketing attribution system computes the sum of the channel-specific terms (e.g., $\Sigma_i \beta_{a_i}\lambda_{a_i}^{t_i}$). The sum of the channel-specific terms may represent the total influence of individual marketing channels without taking into account the interaction between different channels. In some cases, this operation may refer to, or be performed by, a channel-specific component as described with reference to FIG. 10.

Figure 4:
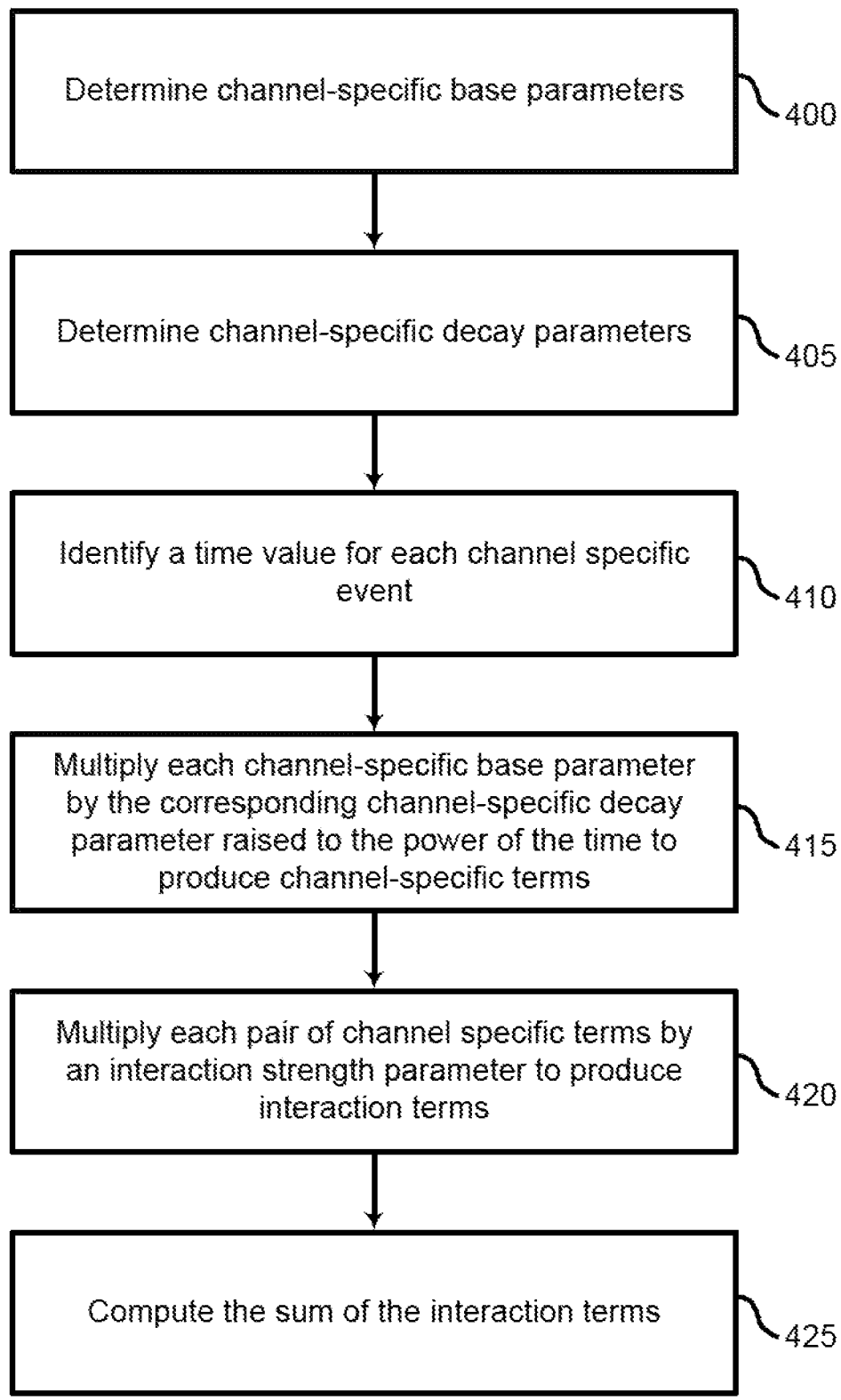
FIG. 4 shows an example of a process to compute the sum of the interaction terms according to aspects of the present disclosure.

FIG. 4 shows an example of a process to compute the sum of the interaction terms according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

Operations 400 through 415 may correspond to steps 300 through 315 described with reference to FIG. 3. However, while FIG. 3 describes how these terms are used to compute channel-specific terms, FIG. 4 describes how they are used to compute interaction terms.

At operation 400, the marketing attribution system determines channel-specific base parameters (e.g., $\beta_a$). In some cases, this operation may refer to, or be performed by, a channel-specific component or an interaction component as described with reference to FIG. 10.

At operation 405, the marketing attribution system determines channel-specific decay parameters (e.g., $\lambda_a$). In some cases, this operation may refer to, or be performed by, a channel-specific component or an interaction component as described with reference to FIG. 10.

At operation 410, the marketing attribution system identifies a time value for each channel specific event (i.e., $t_i$). In some cases, this operation may refer to, or be performed by, a channel-specific component or an interaction component as described with reference to FIG. 10.

At operation 415, the marketing attribution system multiplies each channel-specific base parameter by the corresponding channel-specific decay parameter raised to the power of the time to produce channel-specific terms (e.g., $\beta_{a_i}\lambda_{a_i}^{t_i}$). In some cases, this operation may refer to, or be performed by, a channel-specific component or an interaction component as described with reference to FIG. 10.

At operation 420, the marketing attribution system multiplies each pair of channel specific terms by an interaction strength parameter to produce interaction terms (e.g., $\gamma\beta_{a_i}\beta_{a_j}\lambda_{a_i}^{t_i}\lambda_{a_j}^{t_j}$). The interaction terms may represent the impact that combinations of marketing events have on each other. For example, in many cases the interaction terms are negative because the impact of being exposed to a second marketing event may be less than if the marketing event were presented in isolation. In some cases, this operation may refer to, or be performed by, an interaction component as described with reference to FIG. 10.

At operation 425, the marketing attribution system computes the sum of the interaction terms (e.g., $\Sigma_{i \neq j}\gamma\beta_{a_i}\beta_{a_j}\lambda_{a_i}^{t_i}\lambda_{a_j}^{t_j}$). The sum of the interaction terms may intuitively represent the overall impact of the combinations of marketing events on each other. In some cases, the sum of the interaction terms is negative, meaning that the effect of many different marketing events in combination may not be equal to the sum of the individual events in isolation (i.e., there may be diminishing returns to additional marketing). In some cases, this operation may refer to, or be performed by, an interaction component as described with reference to FIG. 10.

Figure 5:
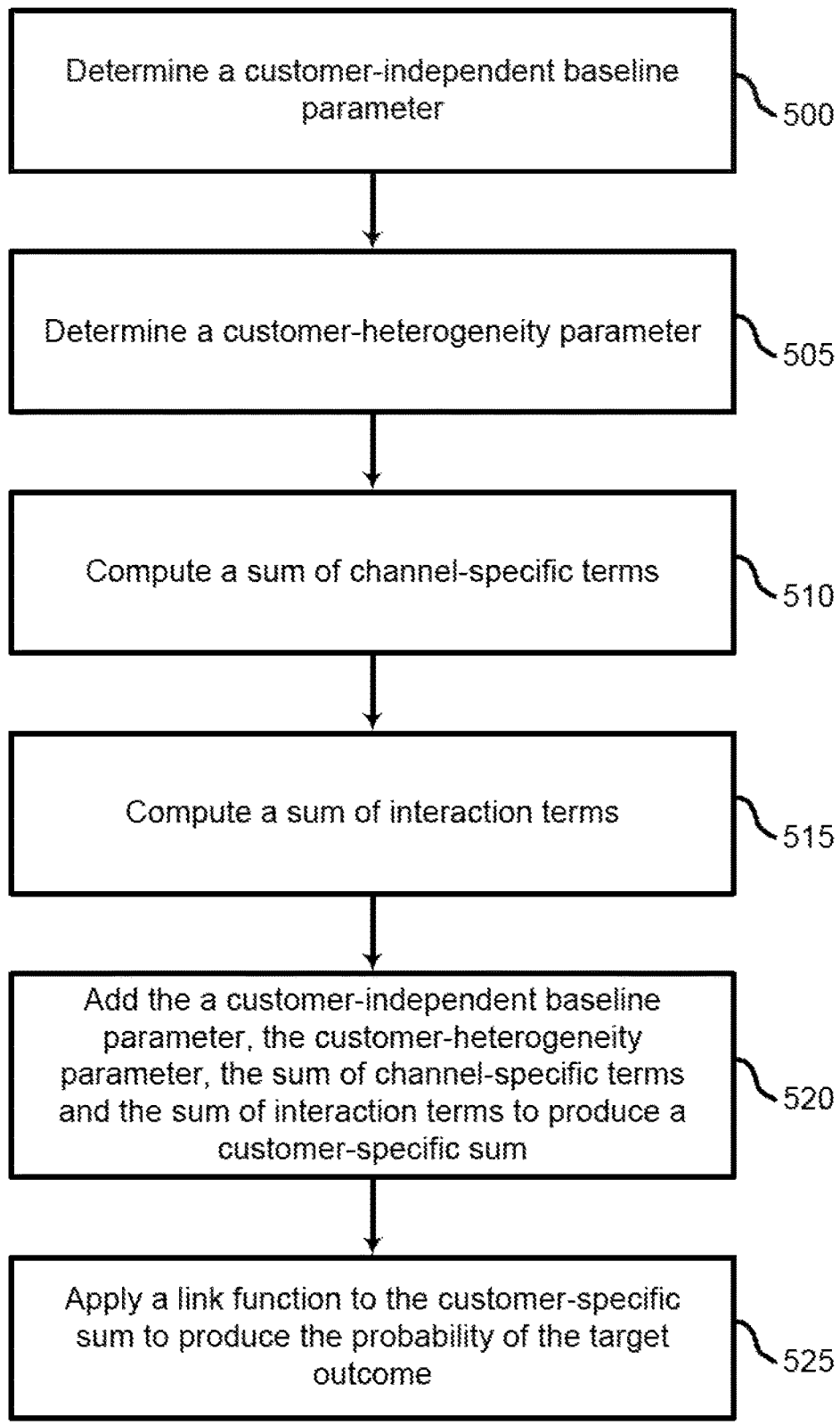
FIG. 5 shows an example of a process to determine a probability of a target outcome for the customer according to aspects of the present disclosure.

FIG. 5 shows an example of a process to determine a probability of a target outcome for the customer according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 500, the marketing attribution system determines a customer-independent baseline parameter (e.g., $\mu$). In some cases, this operation may refer to, or be performed by, a probability component as described with reference to FIG. 10.

At operation 505, the marketing attribution system determines a customer-heterogeneity parameter (e.g., $b_i$). In some cases, this operation may refer to, or be performed by, a probability component as described with reference to FIG. 10.

At operation 510, the marketing attribution system computes a sum of channel-specific terms (e.g., $\Sigma_i \beta_{a_i} \lambda_{a_i}^{t_i}$). In some cases, this operation may refer to, or be performed by, a channel-specific component as described with reference to FIG. 10.

At operation 515, the marketing attribution system computes a sum of interaction terms (e.g., $\Sigma_{i \neq j} \gamma \beta_{a_i} \beta_{a_j} \lambda_{a_i}^{t_i} \lambda_{a_j}^{t_j}$). In some cases, this operation may refer to, or be performed by, an interaction component as described with reference to FIG. 10.

At operation 520, the marketing attribution system adds the customer-independent baseline parameter, the customer-heterogeneity parameter, the sum of channel-specific terms and the sum of interaction terms to produce a customer-specific sum (e.g., $\mu + b_i + \Sigma_i \beta_{a_i} \lambda_{a_i}^{t_i} + \Sigma_{i \neq j} \gamma \beta_{a_i} \beta_{a_j} \lambda_{a_i}^{t_i} \lambda_{a_j}^{t_j}$). In some cases, this operation may refer to, or be performed by, a probability component as described with reference to FIG. 10.

At operation 525, the marketing attribution system applies a link function to the customer-specific sum to produce the probability of the target outcome (e.g., $g(\mu + b_i + \Sigma_i \beta_{a_i} \lambda_{a_i}^{t_i} + \Sigma_{i \neq j} \gamma \beta_{a_i} \beta_{a_j} \lambda_{a_i}^{t_i} \lambda_{a_j}^{t_j})$). In some cases, this operation may refer to, or be performed by, a probability component as described with reference to FIG. 10.

Figure 6:
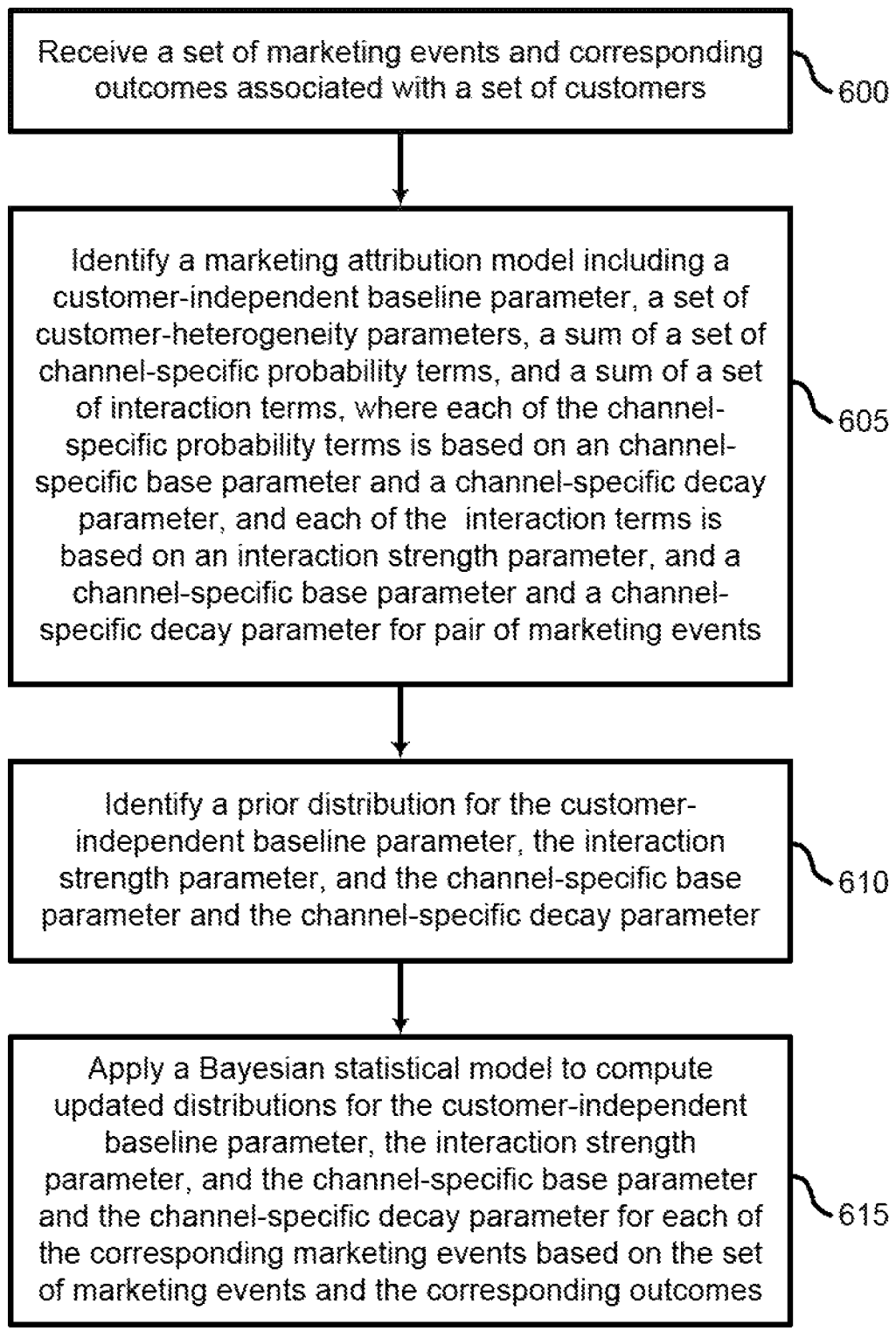
FIG. 6 shows an example of a process for marketing attribution according to aspects of the present disclosure.

FIG. 6 shows an example of a process for marketing attribution according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 600, the marketing attribution system receives a set of marketing events and corresponding outcomes associated with a set of customers. In some cases, this operation may refer to, or be performed by, an input component as described with reference to FIG. 10.

At operation 605, the marketing attribution system identifies a marketing attribution model including a customer-independent baseline parameter, a set of customer-heterogeneity parameters, a sum of a set of channel-specific terms, and a sum of a set of interaction terms, where each of the channel-specific terms is based on a channel-specific base parameter and a channel-specific decay parameter, and each of the interaction terms is based on an interaction strength parameter, and a channel-specific base parameter and a channel-specific decay parameter for pair of marketing events. In some cases, this operation may refer to, or be performed by, a probability component as described with reference to FIG. 10.

At operation 610, the marketing attribution system identifies a prior distribution for the customer-independent baseline parameter, the interaction strength parameter, and the channel-specific base parameter and the channel-specific decay parameter. In some cases, this operation may refer to, or be performed by, a statistical component as described with reference to FIG. 10.

At operation 615, the marketing attribution system applies a Bayesian statistical model to compute updated distributions for the customer-independent baseline parameter, the interaction strength parameter, and the channel-specific base parameter and the channel-specific decay parameter for each of the corresponding marketing events based on the set of marketing events and the corresponding outcomes. In some cases, this operation may refer to, or be performed by, a statistical component as described with reference to FIG. 10.

In some examples, the Bayesian statistical model may be computed using a statistical platform such as R, Stan, Winbugs, pytorch, or any other suitable statistical modelling platform. In some embodiments, a gradient descent or gradient ascent method may be used as an alternative to the Bayesian statistical model. A gradient descent is a first-order iterative optimization algorithm for finding the minimum of a function. A gradient decent algorithm finds a local minimum by starting at a given point and then moving to a new point based on the direction (and magnitude) of the gradient at that point. A gradient ascent is a similar algorithm used to find a local maximum.

In some examples, the prior information in the Bayesian statistical model may have a wide and flat distribution, providing minimal prior information into the model. For example, customer-heterogeneity may be modeled as a random-effect $b_i$ with variance regularized to be small: $b_i \sim N(0, \sigma_b^2)$, where $\sigma_b \sim \exp(0.5)$ and has a wide and flat distribution, providing minimal prior information. A wide non-negative distribution of prior information on the base magnitudes $\beta_a \sim \exp(10)$, where the sign-restriction on $\beta_s$ reflects the knowledge that all ads have a non-negative effect when ads occur without any interactions, provides minimal information as well. Additionally, wide prior information on the interaction term and the baseline $\gamma \sim N(0,10)$, $\mu \sim N(0,10)$ and a flat positive prior information on the decay parameters $\gamma_a \sim \text{Unif}(0,1)$ provide minimal information.

In an illustrative example, a regression setup is used, where the link function g is the identity function, and no random effects or baseline parameters are used. Data may be sampled for a large number of customers (e.g., 10,000 or more), where each customer has 10 actions equally sampled from a random set of 5 actions (actions can be sample more than once). The sample time-differences between the touches from the exponential $\delta t \sim \exp(1)$. The parameters $\beta, \gamma \sim N(0,1)$ and $\lambda \sim \beta(1,1)$. The outcome y is then generated according to the present disclosure.

Figure 7:
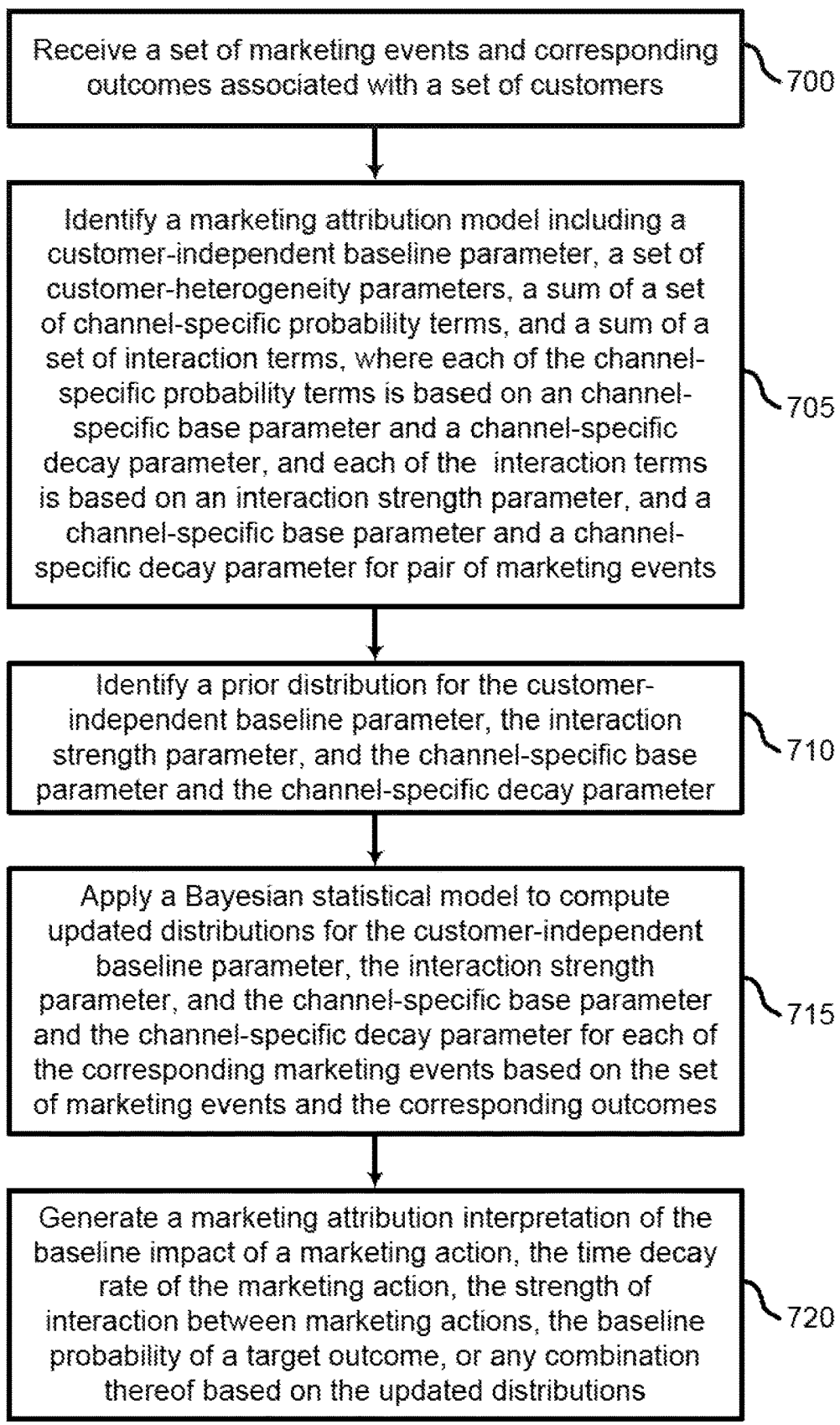
FIG. 7 shows an example of a process for generating a marketing attribution interpretation according to aspects of the present disclosure.

FIG. 7 shows an example of a process for generating a marketing attribution interpretation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 700, the marketing attribution system receives a set of marketing events and corresponding outcomes associated with a set of customers. In some cases, this operation may refer to, or be performed by, an input component as described with reference to FIG. 10.

At operation 705, the marketing attribution system identifies a marketing attribution model including a customer-independent baseline parameter, a set of customer-heterogeneity parameters, a sum of a set of channel-specific terms, and a sum of a set of interaction terms, where each of the channel-specific terms is based on a channel-specific base parameter and a channel-specific decay parameter, and each of the interaction terms is based on an interaction strength parameter, and a channel-specific base parameter and a channel-specific decay parameter for pair of marketing events. In some cases, this operation may refer to, or be performed by, a probability component as described with reference to FIG. 10.

At operation 710, the marketing attribution system identifies a prior distribution for the customer-independent baseline parameter, the interaction strength parameter, and the channel-specific base parameter and the channel-specific decay parameter. In some cases, this operation may refer to, or be performed by, a statistical component as described with reference to FIG. 10.

At operation 715, the marketing attribution system applies a Bayesian statistical model to compute updated distributions for the customer-independent baseline parameter, the interaction strength parameter, and the channel-specific base parameter and the channel-specific decay parameter for each of the corresponding marketing events based on the set of marketing events and the corresponding outcomes. In some cases, this operation may refer to, or be performed by, a statistical component as described with reference to FIG. 10.

At operation 720, the marketing attribution system generates a marketing attribution interpretation of the baseline impact of a marketing action, the time decay rate of the marketing action, the strength of an interaction between marketing actions, the baseline probability of a target outcome, or any combination thereof based on the updated distributions. In some cases, this operation may refer to, or be performed by, an interpretation component as described with reference to FIG. 10.

Thus, the present disclosure provides interpretable parameters that are insightful, even when the true model is incorrectly specified. Furthermore, the sale-likelihood formulation may further incorporate elements such as conditioning on previous sales and other observed characteristics of a customer.

Figure 8:
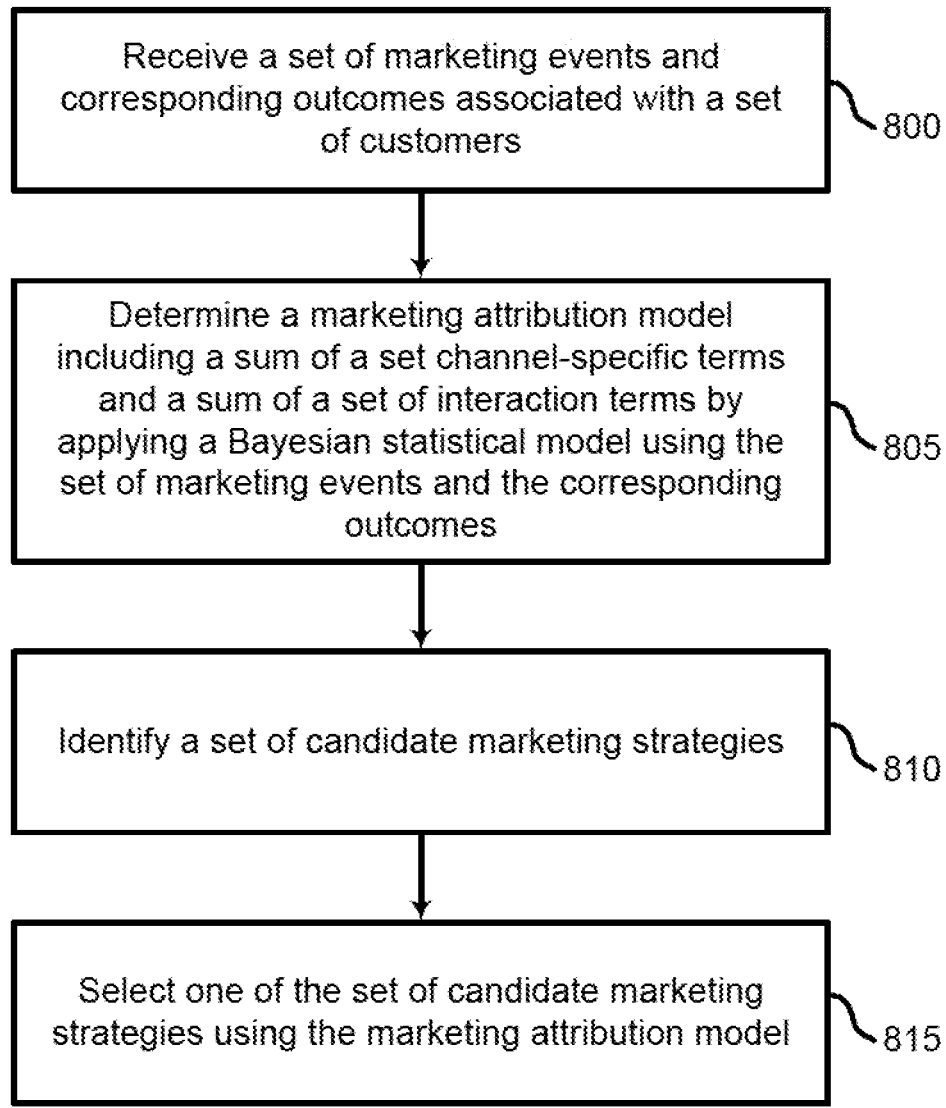
FIG. 8 shows an example of a process for optimizing a marketing strategy according to aspects of the present disclosure.

FIG. 8 shows an example of a process for optimizing a marketing strategy according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 800, the marketing attribution system receives a set of marketing events and corresponding outcomes associated with a set of customers. In some cases, this operation may refer to, or be performed by, an input component as described with reference to FIG. 10.

At operation 805, the marketing attribution system determines a marketing attribution model including a sum of a set of channel-specific terms and a sum of a set of interaction terms by applying a Bayesian statistical model using the set of marketing events and the corresponding outcomes. In some cases, this operation may refer to, or be performed by, a probability component as described with reference to FIG. 10.

At operation 810, the marketing attribution system identifies a set of candidate marketing strategies. In some cases, this operation may refer to, or be performed by, an optimization component as described with reference to FIG. 10.

At operation 815, the marketing attribution system selects one of the sets of candidate marketing strategies using the marketing attribution model. In some cases, this operation may refer to, or be performed by, an optimization component as described with reference to FIG. 10.

FIG. 1 shows an example of a marketing attribution system according to aspects of the present disclosure. The example shown includes server 100, user 105, events database 110, and network 115. User 905 may represent a marketing decision maker. User 905 may request marketing attribution information from server 900 based on information stored in the events database 910. Each of these elements communicates with each other via network 915. In some cases, server 900 receives event information from the user 905. Server 100 may be an example of, or include aspects of, the corresponding element or elements described with reference to FIG. 2. In some examples, the events database 110, the server 100, or both may be components of a marketing analytics platform such as Adobe Experience Cloud©.

FIG. 2 shows an example of a marketing attribution apparatus according to aspects of the present disclosure. Server 200 may be an example of, or include aspects of, the corresponding element or elements described with reference to FIG. 1. Server 200 may include processor unit 205, memory unit 210, input component 215, channel-specific component 220, interaction component 225, probability component 230, statistical component 235, interpretation component 240, and optimization component 245.

A processor unit 205 may include an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions. In some examples, a processor may include special-purpose components for modem processing, baseband processing, digital signal processing, or transmission processing. In some examples, the processor may comprise a system-on-a-chip.

A memory unit 210 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EEPROM), digital tape, a hard disk drive (HDD), and a solid-state drive (SSD). Memory may include any combination of readable and/or writable volatile memories and/or non-volatile memories, along with other possible storage devices.

Input component 215 may receive a set of marketing events and/or corresponding outcomes associated with a customer. For example, input component 215 may receive marketing information from a marketing analytics platform including an events database as described with reference to FIG. 9.

Channel-specific component 220 may compute a sum of a set of channel-specific terms corresponding to the set of marketing events, where each of the set of channel-specific terms includes a channel-specific base parameter and a channel-specific decay parameter. Channel-specific component 220 may also identify a time value corresponding to each of the marketing events. Each of the set of channel-specific terms includes a product of the channel-specific decay parameter raised to a power of the time value and the channel-specific base parameter.

Interaction component 225 may compute a sum of a set of interaction terms, where each interaction term includes a product of a pair of channel-specific terms. In some examples, each of the set of interaction terms has a factor including the channel-specific decay parameter raised to a power of the time value for each channel-specific event of a pair of corresponding marketing events. Interaction component 225 may also identify the interaction strength parameter, where each of a set of interaction terms includes the interaction strength parameter as a factor.

Probability component 230 may determine a probability of a target outcome for the customer based on the sum of the set of channel-specific terms and the sum of the set of interaction terms. Probability component 230 may also identify a customer-independent baseline parameter, a customer-heterogeneity parameter, and a link function. In some examples, an average of customer-heterogeneity parameters across customers is set at 0.

Thus, probability component 230 may identify a marketing attribution model including a customer-independent baseline parameter, a set of customer-heterogeneity parameters, a sum of a set of channel-specific terms, and a sum of a set of interaction terms. Each of the channel-specific terms are based on a channel-specific base parameter and a channel-specific decay parameter.

In one embodiment, probability component 230 may determine the marketing attribution model based on a Bayesian statistical model using the set of marketing events and the corresponding outcomes. In some examples, the Bayesian statistical model includes a Markov Chain Monte Carlo (MCMC) method.

Statistical component 235 may identify a prior distribution for the customer-independent baseline parameter, the interaction strength parameter, and the channel-specific base parameter and the channel-specific decay parameter. Statistical component 235 may also apply a Bayesian statistical model to compute updated distributions for the customer-independent baseline parameter, the interaction strength parameter, and the channel-specific base parameter and the channel-specific decay parameter for each of the corresponding marketing events based on the set of marketing events and the corresponding outcomes.

In some examples, the prior distributions for the customer-independent baseline parameter, the interaction strength parameter, and the channel-specific base parameter for each of the corresponding marketing events include normal distributions. The prior distributions for the channel-specific decay parameter for each of the corresponding marketing events includes a uniform distribution.

Interpretation component 240 may generate a marketing attribution interpretation of the baseline impact of a marketing action, the time decay rate of the marketing action, the strength of an interaction between marketing actions, the baseline probability of a target outcome, or any combination thereof based on the updated distributions.

Optimization component 245 may identify a set of candidate marketing strategies. Optimization component 245 may also select one of the set of candidate marketing strategies using the marketing attribution model. Optimization component 245 may also apply a gradient descent algorithm to the marketing attribution model, where one of the set of candidate marketing strategies is selected based on the gradient descent algorithm.

Accordingly, the present disclosure includes the following embodiments.

A method, apparatus, and non-transitory computer readable medium storing code for causal marketing attribution are described. Embodiments may receive a plurality of marketing events associated with a customer, computing a sum of a plurality of channel-specific terms corresponding to the plurality of marketing events, wherein each of the plurality of channel-specific terms comprises a channel-specific base parameter and a channel-specific decay parameter, computing a sum of a plurality of interaction terms, wherein each interaction term comprises a product of a pair of channel-specific terms, and determining a probability of a target outcome for the customer based on the sum of the plurality of channel-specific terms and the sum of the plurality of interaction terms.

Some examples of the method, apparatus, and non-transitory computer readable medium described above may further include identifying a customer-independent baseline parameter, wherein the probability of the target outcome is based at least in part on the customer-independent baseline parameter.

Some examples of the method, apparatus, and non-transitory computer readable medium described above may further include identifying a customer-heterogeneity parameter, wherein the probability of the target outcome is based at least in part on the customer-heterogeneity parameter. In some examples, an average of customer-heterogeneity parameters across customers is set at 0.

Some examples of the method, apparatus, and non-transitory computer readable medium described above may further include identifying a time value corresponding to each of the marketing events, wherein each of the plurality of channel-specific terms comprises a product of the channel-specific decay parameter raised to a power of the time value and the channel-specific base parameter. In some examples, each of the plurality of interaction terms has a factor comprising the channel-specific decay parameter raised to a power of the time value for each channel-specific event of a pair of corresponding marketing events.

Some examples of the method, apparatus, and non-transitory computer readable medium described above may further include identifying an interaction strength parameter, wherein each of the plurality of interaction terms comprises the interaction strength parameter as a factor.

A method, apparatus, and non-transitory computer readable medium storing code for causal marketing attribution are described. Embodiments of the method may receiving a plurality of marketing events and corresponding outcomes associated with a plurality of customers, identifying a marketing attribution model comprising a customer-independent baseline parameter, a plurality of customer-heterogeneity parameters, a sum of a plurality of channel-specific terms, and a sum of a plurality of interaction terms, wherein each of the channel-specific terms is based on a channel-specific base parameter and a channel-specific decay parameter, and each of the interaction terms is based on an interaction strength parameter, and a channel-specific base parameter and a channel-specific decay parameter for pair of marketing events, identifying a prior distribution for the customer-independent baseline parameter, the interaction strength parameter, and the channel-specific base parameter and the channel-specific decay parameter, and apply a Bayesian statistical model to compute updated distributions for the customer-independent baseline parameter, the interaction strength parameter, and the channel-specific base parameter and the channel-specific decay parameter for each of the corresponding marketing events based on the plurality of marketing events and the corresponding outcomes.

In some examples, the prior distributions for the customer-independent baseline parameter, the interaction strength parameter, and the channel-specific base parameter for each of the corresponding marketing events comprise normal distributions and the prior distributions for the channel-specific decay parameter for each of the corresponding marketing events comprises a uniform distribution. In some examples, the Bayesian statistical model comprises a Markov Chain Monte Carlo (MCMC) method.

Some examples of the method, apparatus, and non-transitory computer readable medium described above may further include generating a marketing attribution interpretation of the baseline impact of a marketing action, the time decay rate of the marketing action, the strength of interaction between marketing actions, the baseline probability of a target outcome, or any combination thereof based on the updated distributions.

A method, apparatus, and non-transitory computer readable medium storing code for causal marketing attribution are described. Embodiments of the method may receiving a plurality of marketing events and corresponding outcomes associated with a plurality of customers, determining a marketing attribution model comprising a sum of a plurality channel-specific terms and a sum of a plurality of interaction terms by applying a Bayesian statistical model using the plurality of marketing events and the corresponding outcomes, identifying a plurality of candidate marketing strategies, and selecting one of the plurality of candidate marketing strategies using the marketing attribution model.

Some examples of the method, apparatus, and non-transitory computer readable medium described above may further include apply a gradient descent algorithm to the marketing attribution model, wherein the one of the plurality of candidate marketing strategies is selected based on the gradient descent algorithm.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for causal marketing attribution, the method comprising:
receiving a request from a user for marketing attribution information for a first marketing channel and a second marketing channel;
collecting, by a marketing analytics platform, first marketing information corresponding to a first set of marketing events, wherein the first marketing information comprises timing information for customer exposures to the first marketing channel comprising online advertising;
collecting, by the marketing analytics platform, second marketing information corresponding to a second set of marketing events, wherein the second marketing information comprises timing information for customer exposures to the second marketing channel, and wherein the second marketing channel is different from the first marketing channel;

identifying a time series corresponding to the first set of marketing events and the second set of marketing events;

computing a sum of a plurality of channel-specific terms corresponding to each of the first set of marketing events and each of the second set of marketing events, wherein each channel-specific term of the plurality of channel-specific terms comprises a channel-specific base parameter and a channel-specific decay parameter raised to a power of a corresponding time value;

computing a sum of a plurality of interaction terms, wherein each interaction term of the plurality of interaction terms comprises a product of a pair of channel-specific terms and at least one interaction term of the plurality of interaction terms corresponds to the first set of marketing events and the second set of marketing events;

determining a probability of a target outcome for a customer based on the sum of the plurality of channel-specific terms, the sum of the plurality of interaction terms, and the time series;

identifying, by the marketing analytics platform, a marketing attribution model for the first channel based at least in part on the probability of the target outcome, wherein the marketing attribution model identifies an influence of the first marketing channel on a behavior of the customer based at least in part on the second marketing channel; and providing, by the marketing analytics platform to the user, the marketing attribution information, wherein the marketing attribution information is implemented by the marketing attribution model.

2. The method of claim 1, further comprising:
identifying a customer-independent baseline parameter, wherein the probability of the target outcome is based at least in part on the customer-independent baseline parameter.

3. The method of claim 1, further comprising:
identifying a customer-heterogeneity parameter, wherein the probability of the target outcome is based at least in part on the customer-heterogeneity parameter.

4. The method of claim 3, wherein:
an average of customer-heterogeneity parameters across customers is set at 0.

5. The method of claim 1, wherein:
each channel-specific term of the plurality of channel-specific terms comprises a product of the channel-specific decay parameter raised to the power of the corresponding time value and the channel-specific base parameter.

6. The method of claim 5, wherein:
each interaction term of the plurality of interaction terms has a factor comprising the channel-specific decay parameter raised to the power of the corresponding time value for each channel-specific event of a pair of corresponding marketing events.

7. The method of claim 1, further comprising:
identifying an interaction strength parameter, wherein each interaction term of the plurality of interaction terms comprises the interaction strength parameter as a factor.

8. A method for causal marketing attribution, the method comprising:
collecting, by a marketing analytics platform, first marketing information corresponding to a first set of marketing events, wherein the first marketing information comprises timing information for customer exposures to a first marketing channel comprising online advertising;

collecting, by the marketing analytics platform, second marketing information corresponding to a second set of marketing events, wherein the second marketing information comprises timing information for customer exposures to a second marketing channel, and wherein the second marketing channel is different from the first marketing channel;

identifying a time series corresponding to the first set of marketing events and the second set of marketing events;

computing a sum of a plurality of channel-specific terms corresponding to each of the first set of marketing events and each of the second set of marketing events, wherein each channel-specific term of the plurality of channel-specific terms comprises a channel-specific base parameter and a channel-specific decay parameter raised to a power of a corresponding time value;

computing a sum of a plurality of interaction terms, wherein each interaction term of the plurality of interaction terms comprises a product of a pair of channel-specific terms and at least one interaction term of the plurality of interaction terms corresponds to the first set of marketing events and the second set of marketing events;

determining a probability of a target outcome for a customer based on the sum of the plurality of channel-specific terms, the sum of the plurality of interaction terms, and the time series;

identifying, by the marketing analytics platform, a marketing attribution model for the first channel based at least in part on the probability of the target outcome, wherein the marketing attribution model identifies an influence of the first marketing channel on a behavior of the customer based at least in part on the second marketing channel; and providing, by the marketing analytics platform to a user, marketing attribution information, wherein the marketing attribution information is implemented by the marketing attribution model.

9. The method of claim 8, further comprising:
identifying a customer-independent baseline parameter, wherein the probability of the target outcome is based at least in part on the customer-independent baseline parameter.

10. The method of claim 8, further comprising:
identifying a customer-heterogeneity parameter, wherein the probability of the target outcome is based at least in part on the customer-heterogeneity parameter.

11. The method of claim 10, wherein:
an average of customer-heterogeneity parameters across customers is set at 0.

12. The method of claim 8, wherein:
each channel-specific term of the plurality of channel-specific terms comprises a product of the channel-specific decay parameter raised to the power of the corresponding time value and the channel-specific base parameter.

13. The method of claim 12, wherein:
each interaction term of the plurality of interaction terms has a factor comprising the channel-specific decay parameter raised to the power of the corresponding time value for each channel-specific event of a pair of corresponding marketing events.

14. The method of claim 8, further comprising:
identifying an interaction strength parameter, wherein each interaction term of the plurality of interaction terms comprises the interaction strength parameter as a factor.

15. A method for causal marketing attribution, the method comprising:
receiving a request from a user for marketing attribution information for a first marketing channel and a second marketing channel;
collecting, by a marketing analytics platform:
first marketing information corresponding to a first set of marketing events, wherein the first marketing information comprises timing information for customer exposures to the first marketing channel comprising online advertising; and
second marketing information corresponding to a second set of marketing events, wherein the second marketing information comprises timing information for customer exposures to the second marketing channel, and wherein the second marketing channel is different from the first marketing channel;
computing a sum of a plurality of channel-specific terms corresponding to each of the first set of marketing events and each of the second set of marketing events, wherein each channel-specific term of the plurality of channel-specific terms comprises a channel-specific base parameter and a channel-specific decay parameter raised to a power of a corresponding time value;
computing a sum of a plurality of interaction terms, wherein each interaction term of the plurality of interaction terms comprises a product of a pair of channel-specific terms and at least one interaction term of the plurality of interaction terms corresponds to the first set of marketing events and the second set of marketing events;
identifying, by the marketing analytics platform, a marketing attribution model for the first channel, wherein the marketing attribution model identifies an influence of the first marketing channel on a behavior of the customer based at least in part on the second marketing channel; and
providing, by the marketing analytics platform to the user, the marketing attribution information, wherein the marketing attribution information is implemented by the marketing attribution model.

16. The method of claim 15, further comprising:
identifying a customer-independent baseline parameter.

17. The method of claim 15, further comprising:
identifying a customer-heterogeneity parameter.

18. The method of claim 17, wherein:
an average of customer-heterogeneity parameters across customers is set at 0.

19. The method of claim 15, wherein:
each channel-specific term of the plurality of channel-specific terms comprises a product of the channel-specific decay parameter raised to the power of the corresponding time value and the channel-specific base parameter.

20. The method of claim 19, wherein:
each interaction term of the plurality of interaction terms has a factor comprising the channel-specific decay parameter raised to the power of the corresponding time value for each channel-specific event of a pair of corresponding marketing events.

* * * * *